United States Patent
Neumaier et al.

(10) Patent No.: US 9,152,141 B2
(45) Date of Patent: Oct. 6, 2015

(54) METHODS AND APPARATUS FOR GENERATING CONTROL DATA FOR THE FORMATION OF A TOOTH FLANK BY MILLING A WORKPIECE ON A MACHINE TOOL

(75) Inventors: Josef Neumaier, Pfronten (DE);
Thomas Lochbihler, Vils (AT);
Uwe-Carsten Hansen, Eisenberg (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 625 days.

(21) Appl. No.: 13/212,748

(22) Filed: Aug. 18, 2011

(65) Prior Publication Data
US 2012/0072008 A1  Mar. 22, 2012

(30) Foreign Application Priority Data
Aug. 18, 2010 (DE) .......................... 10 2010 039 491

(51) Int. Cl.
*G06F 19/00* (2011.01)
*G05B 19/18* (2006.01)

(52) U.S. Cl.
CPC .................................. *G05B 19/182* (2013.01)

(58) Field of Classification Search
USPC .............................. 700/164; 409/26; 475/221
See application file for complete search history.

(56) References Cited

U.S. PATENT DOCUMENTS

| | | |
|---|---|---|
| 4,981,402 A | 1/1991 | Krenzer et al. |
| 5,310,295 A | 5/1994 | Palmateer, Jr et al. |
| 5,716,174 A | 2/1998 | Stadtfeld et al. |
| 6,080,199 A | 6/2000 | Umeyama et al. |
| 6,128,969 A | 10/2000 | Litvin et al. |
| 6,182,506 B1 | 2/2001 | Hoikkala |
| 6,282,502 B1 | 8/2001 | Sundaresan et al. |
| 6,712,566 B2 | 3/2004 | Stadtfeld et al. |
| 7,274,975 B2 * | 9/2007 | Miller ........................... 700/295 |
| 7,869,904 B2 * | 1/2011 | Cannon et al. ................ 700/295 |
| 7,974,730 B2 * | 7/2011 | Durr .............................. 700/164 |
| 8,307,551 B2 | 11/2012 | Kotthoff |

(Continued)

FOREIGN PATENT DOCUMENTS

| | | |
|---|---|---|
| DE | 10 2009 008 124 | 8/2010 |
| WO | 2008/045572 | 4/2008 |
| WO | 2008/133517 | 11/2008 |

OTHER PUBLICATIONS

KISSsoft AG., "KISSsoft Release 1012008 Benutzerhandbuch," KISSsoft Berechnungsprogramme fur den Maschinenbau, Oct. 2008, 857 pages, S. I-35, II-45, ---66 bis II-75 [http://www.scope-online.de/upload_hoppenstedt/Kisssoft_Benutzerhandbuch_620187.pdf].

(Continued)

Primary Examiner — Robert Fennema
(74) Attorney, Agent, or Firm — Hanley, Flight & Zimmerman, LLC

(57) ABSTRACT

A disclosed example method for generating control data for the formation of a tooth flank by milling a workpiece on a numerically controlled machine tool with at least 5 axes, at a universal machine tool, through successive passes with a milling cutter on the machine tool based on generated control data involves defining a geometry of a tooth flank, determining a contact pattern area on the predefined tooth flank geometry, determining parameters to vary the predefined tooth flank geometry, and generating control data on the basis of tooth flank geometry modified based on the defined contact pattern area and of the defined parameters.

25 Claims, 6 Drawing Sheets

(56) References Cited

U.S. PATENT DOCUMENTS

| | | |
|---|---|---|
| 8,340,806 B2 | 12/2012 | Kotthoff et al. |
| 8,402,659 B2 | 3/2013 | Kotthoff |
| 8,903,537 B2 | 12/2014 | Neumaier et al. |
| 2001/0043050 A1* | 11/2001 | Fisher, Jr. ............ 320/101 |
| 2002/0158360 A1* | 10/2002 | Joseph ............... 264/40.3 |
| 2002/0167282 A1* | 11/2002 | Kirkpatrick et al. ........ 315/248 |
| 2005/0159938 A1 | 7/2005 | Shigemi et al. |
| 2005/0171631 A1 | 8/2005 | Arvin |
| 2006/0253218 A1* | 11/2006 | Blumberg et al. ........... 700/159 |
| 2007/0238570 A1* | 10/2007 | Engelmann et al. ......... 475/221 |
| 2008/0134507 A1 | 6/2008 | Kotthoff |
| 2008/0152940 A1 | 6/2008 | Kotthoff |
| 2008/0201951 A1 | 8/2008 | Kotthoff |
| 2008/0209730 A1 | 9/2008 | Kotthoff |
| 2010/0204814 A1 | 8/2010 | Neumaier et al. |
| 2010/0225452 A1* | 9/2010 | Murdoch .............. 340/10.5 |
| 2011/0103911 A1* | 5/2011 | Stadtfeld ............... 409/26 |
| 2012/0003058 A1* | 1/2012 | Hutter et al. ............. 409/26 |
| 2012/0072009 A1 | 3/2012 | Neumaier et al. |
| 2012/0099939 A1* | 4/2012 | Stadtfeld ............... 409/38 |

OTHER PUBLICATIONS

Hans-Peter Schossig, "Auf einfachem Weg zu guten Zähnen—Zahnräder mit hoher Qualität auf Standardmaschinen fräsen" ["The Easy Way to Good Teeth—Mill High-Quality Gear Wheels on Standard Machines"] (published in the journal Werkstatt und Betrieb, Carl Hanser Verlag, Munich, edition 2007, No. 4/28, ISSN 0043-2792, pp. 28-30 and 32 (1 page of English language summary included).

German Patent and Trademark Office, "First Office Action," issued in connection with German Patent Application No. 102010039491.2, May 5, 2014 (15 pages).

\* cited by examiner

METHODS AND APPARATUS FOR GENERATING CONTROL DATA FOR THE FORMATION OF A TOOTH FLANK BY MILLING A WORKPIECE ON A MACHINE TOOL

RELATED APPLICATIONS

This patent claims priority to German Patent Application No. 10 2010 039 491.2, filed on Aug. 18, 2010, which is hereby incorporated by reference herein in its entirety.

FIELD OF THE DISCLOSURE

The present disclosure relates generally to machine tools and, more particularly, to methods and apparatus for generating control data for the formation of a tooth flank by milling a workpiece on a machine tool.

BACKGROUND

From the prior art it is commonly known how to produce gear wheels or other toothed workpieces on special tooth-forming machine tools, that is, on special single-purpose machines. For example, special gear milling machines are known, which can produce a tooth profile on a workpiece in that a profile milling cutter or a profiled grinding wheel is controlled in such a way that tooth flanks or teeth are created in the workpiece. The gear cutting tools or profiled disks that already have a cross-sectional shape corresponding to the desired profile shape of the finished tooth flanks on the workpiece. Because the gear cutting tool or the profiled disk is controlled along a path through the workpiece, one or two opposing tooth flanks are thus produced, the profile of which corresponds to the shape of the tool.

Furthermore, conventional toothing machines are known which are likewise counted among the single-purpose machines and in which toothing is produced on a gear wheel using a milling cutter tool, for example, according to the Klingelnberg-, Glason- or Oerlikon method. Here too, the future shape of the tooth flank is defined by the shape of the blade edge of the milling cutter tool.

The known methods described above for the production of toothing on a workpiece have the disadvantage that, after processing of the workpiece, said workpiece then requires post-processing. Modeling and/or an optimization of the contact pattern, for example, which are needed to optimize the running behavior of the toothed workpiece under a specific load for instance, require an additional work step in which the tooth flanks of the toothing on the workpiece have to be reworked according to the desired contact pattern. This is done either manually or on an additional machine tool.

For example, WO 2008/045572 A1 describes this kind of reworking of a workpiece with toothing for the subsequent reworking of the tooth flanks to modify the tooth flank geometry in order to obtain a desired contact pattern behavior. According to the teaching of WO 2008/045572 A1, the reprocessing is performed using lapping, however, such reworking can also be achieved by grinding or by other precision cutting, for example.

This kind of reworking is very time-consuming, however, and in addition, requires that the contact pattern of the toothing be tested under load or without load, and if it still does not correspond to the desired contact pattern, an additional reworking of the tooth flank must be performed.

Production of a toothed workpiece on a universal machine tool is described, for example, in the article "Auf einfachem Weg zu guten Zähnen-Zahnräder mit hoher Qualität auf Standardmaschinen fräsen" [A simple means for cutting of high quality teeth/gear wheels on standard machines] by Hans-Peter Schossig (appeared in the journal WERKSTATT UND BETRIEB, by Carl Hanser Publishing, Munich, edition 2007, No. 4/28, on pages 28 to 32, ISSN 0043-2792) and in WO 2008/133517 A1. Other techniques (e.g., techniques disclosed in German application no. DE 10 2009 008 124) were developed by the assignee of the present application.

DETAILED DESCRIPTION

Figure 1:
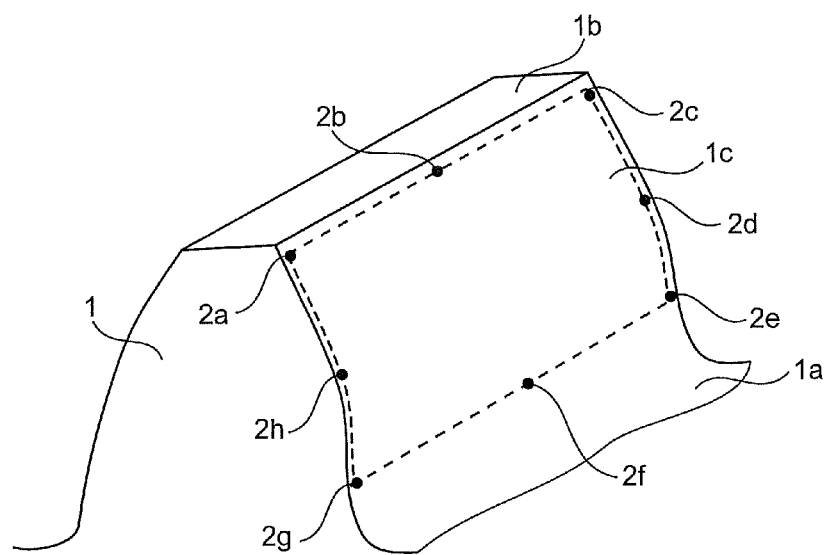
FIG. 1 shows an example, schematic representation of a tooth in the gearing on a workpiece.

In the following, disclosed examples are described in detail with reference to the attached Figures. However, the scope of coverage of this patent is not limited to the examples disclosed herein. To the contrary, this patent covers all methods, apparatus, systems, and articles of manufacture fairly falling within the scope of the appended claims either literally or under the doctrine of equivalents. In the Figures, same or similar features of the disclosed examples are denoted by the same reference numerals.

Example methods and apparatus are disclosed for producing toothed workpieces on universal numerically controlled machine tools with at least 5 axes such as, for example, a milling machine, a universal milling machine or a processing center, in which the toothing is produced on the workpiece by standard milling cutters such as, for example, end mill cutters with or without end radius in a specific processing step through successive milling passes to create a tooth flank on the workpiece. In contrast to the production of toothed workpieces on a conventional, tooth-forming single-purpose machine as described above, examples disclosed herein are directed to the formation of toothing on a workpiece on universal machine tools such as a milling machine, a universal milling machine or a processing center.

Example methods and apparatus are disclosed for generating control data for the formation of a tooth flank by milling a workpiece on a numerically controlled machine tool with at least 5 axes, in particular on a universal machine tool, through successive passes with a milling cutter on the machine tool based on the generated control data.

In particular, example methods and apparatus are disclosed for creating control data for the formation of a tooth flank by milling a workpiece on a universal numerically controlled machine tool with at least 5 axes such as, for example, a milling machine, a universal milling machine or a processing center, wherein the tooth flank is controlled in accordance with a predefined tooth flank geometry by successive passes of a milling cutter of a machine tool along machining paths defined by the control data, in order specifically to remove material from the workpiece and thus produce a tooth flank.

In addition, example methods and apparatus are disclosed for creating control data for the production of a workpiece having toothing, comprising the step of predefining of the toothing data, calculating a model of the workpiece based on the predefined toothing data, comprising the step of calculating a defined tooth flank geometry based on the predefined toothing data, and generating control data for the production of the workpiece, comprising the step of generating control data for formation of a tooth flank of the toothing on the workpiece.

Furthermore, example numerically controlled machine tools are disclosed with at least 5 axes, in particular a universal machine tool such as, for example, a milling machine, a universal milling machine or a processing center for milling cutting of a workpiece through successive passes with a milling cutter on the machine tool based on the generated control data, wherein the machine tool comprises in particular a device for generating control data.

Finally, example computer program products are disclosed, wherein the computer program is saved on a storage medium in the form of a sequence of states, which correspond to commands designed to be processed by a data processing means of a data processing device, so that a device for generating control data is created.

Examples disclosed herein are useful in simplifying the processing and/or the production of toothed workpieces and to expand the options for milling a workpiece on a numerically controlled machine tool with at least 5 axes, in particular on a universal machine tool such as, for example, a milling machine, a universal milling machine or a processing center. In particular, disclosed examples define methods and devices for generating control data, which expand the possibilities of the newly developed method of producing a toothed workpiece on a machine tool, in particular on a universal machine tool, through the successive and/or specific milling of a tooth flank on the workpiece based on the generated control data. In particular, disclosed examples also enable the production of a toothed workpiece in such a way that at least one tooth flank of the workpiece can be produced in a simple and efficient manner with a desired contact pattern.

According to a first aspect of some disclosed examples, an example method is disclosed for generating control data for forming the tooth flank by milling a workpiece on a numerically controlled machine tool with at least 5 axes, in particular on a universal machine tool such as, for example, a milling machine, a universal milling machine or a processing center, through successive passes with a milling cutter of a machine tool, based on the generated control data. According to some disclosed examples, the method comprises the following steps: The predefinition of a tooth flank geometry, the definition of a contact pattern area on the predefined tooth flank geometry, the definition of parameters for modifying the predefined tooth flank geometry and the generation of control data depending upon the specified contact pattern area and the tooth flank geometry defined contact pattern area modified by the defined parameters.

Thus, in accordance with some disclosed examples, for example, tooth flank geometry is defined as a mathematically accurate and/or theoretical tooth flank geometry corresponding to predefined information and/or data determining the tooth flank geometry such as, for example, information and/or data such as, for example, information and/or data concerning the type of toothing, workpiece shape, workpiece geometry, toothing shape and/or profile shape, which can be used, for example, as the basis for numerical calculation of a mathematically accurate and/or theoretical tooth flank geometry, for example, using a CAD program.

The control data, however, are not generated directly based on the predefined tooth flank geometry and/or based on a model of the predefined tooth flank geometry (as was the case, for instance, in DE 10 2009 008 124), but rather, also according to the disclosed examples, a contact pattern area contact pattern area is determined on the predefined tooth flank geometry and furthermore, parameters for modifying the predefined tooth flank geometry are determined. Accordingly, based on the defined parameters for modifying the predefined tooth flank geometry and based on the defined contact pattern area on the predefined tooth flank geometry, a modified and/or altered tooth flank geometry can be calculated, wherein according to the disclosed examples, the control data can be generated based on the modified tooth flank geometry.

This has the advantage that the processing of the workpiece on the machine tool based on control data corresponding to the modified tooth flank geometry is done in such a way that after processing, the finished workpiece already have one tooth flank with an actual tooth flank geometry corresponding to the modified tooth flank geometry. Therefore, reprocessing of the tooth flank(s), for example, for optimizing and/or modeling of a contact pattern, is no longer necessary. Rather, the tooth flank or the tooth flanks can be produced directly based on the control data, such that a desired contact pattern behavior will appear without necessary reprocessing.

Thus, examples disclosed herein make it possible to vary tooth flank geometry in a simple and efficient manner so that it corresponds to a mathematically accurate and/or theoretically accurate tooth flank geometry, even before generating the control data, for example, depending upon the desired contact pattern. Thus, the versatility of the disclosed example methods for preparing a toothed workpiece on a numerically controlled machine tool with at least 5 axes through successive milling passes and/or specific processing of the tooth flank with a cutting tool such as, for example, an end mill cutter or similar cutting tool, can be expanded significantly.

In particular, in comparison to methods using gear milling- and/or gear grinding methods or using milling cutter methods such as, for example, the Klingelnberg-, Gleason-, or Oerlikon method, the production of gear wheels can be improved, simplified and its applications expanded, since the production of a modified tooth flank geometry can be performed directly based on the generated control data, whereas in the conventional methods described above, a profiled shape is essentially defined through the tool shape and thus, subsequent processing is necessary for the modeling of a contact pattern.

In some preferred examples, the step of generating control data comprises the calculation of a model of the modified tooth flank geometry based on the predefined tooth flank geometry, the calculation of the defined contact pattern area and of the defined parameters.

This has the advantage that a model of the modified tooth flank geometry exists and/or is calculated that deviates from the model of a mathematically accurate and/or theoretical tooth flank geometry corresponding to the defined contact pattern area and to the defined parameters for modifying the predefined tooth flank geometry, in which control data such as, for example, an NC program, can be generated based on the model of the modified tooth flank geometry in a simple and potentially automated manner.

In some preferred examples, the modification of the tooth flank geometry is done in such a way that with the modified tooth flank geometry, a region corresponding to the defined contact pattern area, is unchanged in comparison to the predefined tooth flank geometry, in particular wherein the modified tooth flank geometry differs from the predefined tooth flank geometry only outside of the defined contact pattern area.

The has the advantage that in the step of determining a contact pattern area on the predefined tooth flank geometry, a region can be easily be defined, in which the tooth flank geometry is not modified and/or not altered in comparison to the predefined tooth flank geometry, for example, in comparison to the mathematically accurate and/or theoretical tooth flank geometry. Therefore a region can easily be defined on the tooth flank in which the modified tooth flank geometry corresponds to the predefined tooth flank geometry, that is, in which the tooth flank still has the geometry of the predefined tooth flank geometry in spite of variation and/or modification of the tooth flank geometry. Outside of the defined contact pattern area the geometry of the tooth flank can differ from the predefined tooth flank geometry depending upon the defined parameters.

In some preferred examples, the predefined tooth flank geometry corresponds to tooth flank geometry with a maximum contact pattern across the tooth flank during load-free rolling of the tooth flank with a mating flank.

Thus, the predefined tooth flank geometry corresponds to a mathematically accurate and/or theoretical tooth flank geometry, in which the tooth flank essentially comes into contact with the entire tooth flank during load-free rolling with a mating flank, in particular when rolling with a likewise mathematically accurate and/or theoretical mating flank, and thereby essentially has a maximum maximized contact pattern across the tooth flank, preferably, but not necessarily, essentially across the entire tooth flank.

In some preferred examples, the defined contact pattern area after modifying the tooth flank geometry describes a contact pattern during load-free rolling of the tooth flank with a mating flank, in particular such that the modified tooth flank geometry preferably, but not necessarily, corresponds to a tooth flank geometry that has a contact pattern corresponding to the defined contact pattern area during load-free rolling with a mating flank.

This has the advantage that, by the determining the contact pattern area, the region can be determined which determines or defines the corresponding contact pattern during load-free rolling with the mating flank. This can be achieved in that the defined contact pattern area corresponds to that area of the tooth flank, in which the modified tooth flank geometry is not modified in comparison to the predefined tooth flank geometry, which preferably, but not necessarily, corresponds to a mathematically accurate and/or theoretical tooth flank geometry, so that the modified tooth flank geometry in the defined contact pattern area still has a geometry that corresponds to a mathematically accurate and/or theoretical tooth flank geometry.

In some preferred examples, the contact pattern area is determined in such a way that a contact pattern with the desired size, structure and/or position results during load-free rolling of the tooth flank with a mating flank.

This has the advantage that the contact pattern of the tooth flank during load-free rolling with the mating flank can be determined or defined in accordance with the defined contact pattern area, wherein the result is an actual contact pattern that essentially corresponds to a desired size of the contact pattern, to a desired configuration of the contact pattern and/ or to a desired position of the contact pattern on the tooth flank.

In some preferred examples, the determination of the contact pattern area encompasses the determination of a shape of the contact pattern area, the determination of a position of the contact pattern area on the tooth flank, the determination of a size of the contact pattern area and/or the determination an alignment of the contact pattern area on the tooth flank.

This has the advantage that the step of determining of the contact pattern area makes it possible to determine and/or to define the desired size, configuration and/or position of the contact pattern during load-free rolling of the tooth flank with the mating flank. In a simple manner it is therefore necessary merely to determine or to define a shape of the contact pattern, for example, by selection of a shape of the contact pattern from a plurality of defined basic shapes, to determine or to define a position of the contact pattern area on the tooth flank, for example by defining of position data and/or of coordinates on the tooth flank, to determine and/or to define a size of the contact pattern area, for example, by defining the parameters determining the size of the contact pattern area depending upon the determined shape of the contact pattern area, and/or to determine or to define an alignment of the contact pattern area on the tooth flank, for example, by defining an angular alignment of the determined shape of the contact pattern area on the tooth flank.

In some preferred examples, the shape of the contact pattern surface is defined as to be circular, ellipsoidal, rectangular, square or trapezoidal.

Thus, the shape of the contact pattern surface can be determined or defined corresponding to a basic geometric shape for which the position, size and/or alignment to the tooth flank can be determined by simple parameters. In some preferred examples, the step of determining a shape of the contact pattern area encompasses the step of selecting the shape of the contact pattern surface from a group of basic geometric shapes, e.g. selection of the shape from one of the following shapes: Circle, ellipse, rectangle, square or trapezoid. In the case of a circle, the position of the contact pattern on the tooth flank can be defined, for example, by specifying the origin of the circle, and the size can be defined by determining the radius. In the case of ellipses, the size of the contact pattern area is preferably, but not necessarily, defined by the two major axes or minor axes of the ellipse, and the position of the contact pattern area is defined by the point of intersection of the two primary axes and/or semi-axes of the ellipse. An alignment of the contact pattern area to the tooth flank can be determined in the case of an ellipse, for example, by defining an alignment angle to one of the primary axes of the ellipse.

In the case of squares, the size of the contact pattern area can be determined by one side length, for example, and in the case of rectangles, by two side lengths. The position of the contact pattern area can be defined by the midpoint, for example, or even by one or several corner points. Determining of the size of the contact pattern area for a trapezoidal configuration generally requires at least three parameters, for example, the determination of two opposing sides of the trapezoid and the distance between them. In the case of rectangles, squares or trapezoids, the alignment of the contact pattern area can be determined by determining an angular alignment of one side of the contact pattern area.

In some preferred examples, the parameters for varying the predefined tooth flank geometry are determined in such a way that a contact pattern with the desired size, structure and/or position results when the tooth flank is rolled with a mating flank under load.

This has the advantage that the modification of the tooth flank geometry depending upon the defined parameters for variation of the predefined tooth flank geometry makes it possible to determine or to define a contact pattern with a desired size, structure and/or position when the tooth flank is rolled with a mating flank under load, for example, under a specific load value. Therefore, even before generating the control data, a contact pattern with the desired size, structure and/or position can be determined that will occur on the finished workpiece when the produced tooth flank is rolled with a mating flank under a specific load value, for example, with a load value corresponding to the intended load on the toothed workpiece when said workpiece is being operated as intended.

In some preferred examples, the step for defining the parameters for modifying the predefined tooth flank geometry comprises the step of determining at least one of the specific reduction parameters on at least one determined reduction position on the predefined tooth flank geometry.

This has the advantage that a reduction of the tooth flank geometry can be defined outside of the defined contact pattern area in a particularly simple manner, by determining specific reduction parameters at the determined reduction positions.

In some preferred examples, the modified tooth flank geometry is reduced at each of the at least one determined reduction positions corresponding to the specific determined reduction parameter as compared with the predefined tooth flank geometry.

This has the advantage that even before generating the control data, reduction parameters can be determined at specified reduction positions, wherein the tooth flank geometry can be reduced even before processing of the workpiece, i.e. before or during the generation of the control data, in accordance with the determined reduction parameters at the specific reduction positions. Thus a tooth-cutting machinist, who has heretofore been familiar with the post-processing of tooth flanks for the modeling of a gear wheel, for example, can employ his experience by defining the reduction parameters at determined reduction positions which correspond to his experience in processing the reduction of the tooth flank during a re-processing.

In some preferred examples, a model of the modified tooth flank geometry is then computed, preferably, but not necessarily, based on the modified tooth flank geometry, which has already been reduced to the specific, defined reduction positions in accordance with the determined reduction parameters, e.g. corresponding to tooth flank geometry as it would be obtained if an exact tooth flank geometry were produced on conventional toothing machines after additional re-processing for modeling of the contact pattern.

In some preferred examples, the method encompasses the additional step of determining one or a plurality of reduction positions on the predefined tooth flank geometry.

This has the advantage that, in addition to the reduction parameters, the reduction positions can also be determined, where the tooth flank geometry is reduced in accordance with the defined reduction parameters before or during the generation of the control data, for example, in the model of the tooth flank geometry.

In some preferred examples, at least one reduction position is positioned on the outside of the predefined tooth flank geometry. Preferably, but not necessarily, at least one reduction position is positioned on a corner of the predefined tooth flank geometry. Preferably, but not necessarily, at least one reduction position is positioned between neighboring corners of the predefined tooth flank geometry. In some preferred examples, the reduction positions—and particularly preferred, but not necessary, are at least eight reduction positions—are determined in such a way that four reduction positions are each placed at one corner of the predefined tooth flank geometry, and/or one reduction position each is positioned between two neighboring corners of the predefined tooth flank geometry.

This has the advantage that one or a plurality of reduction positions can already be defined at specific positions of the tooth flank, wherein for each of the specific workpieces and/or the specific tooth flanks to be carved out, only the reduction parameters at the specific, predefined reduction positions have to be defined, and the reduction positions that are already at optimized positions on the tooth flank predefined.

In some preferred examples, the tooth flank geometry is modified in comparison to the predefined tooth flank geometry in such a way that the tooth flank geometry in the defined contact pattern area is not modified and reduced to the specific, defined reduction positions corresponding to the specific, defined reduction parameters, and the transition between the reduction positions and the contact pattern surface is preferably, but not necessarily, calculated uniformly, preferably, but not necessarily, during the step, during which a model of the modified tooth flank geometry is calculated. In some preferred examples, the transition from the tooth flank geometry to the outside of the defined contact pattern area is consistent and/or tangential. Thus, a particularly uniform geometry of the reduced, modified tooth flank geometry can be attained.

In some preferred examples, the method encompasses the additional step of presenting a model of the modified tooth flank geometry.

This has the advantage that the modified tooth flank geometry can be visually verified in order to define corrected reduction parameters, in additional steps if necessary, even before generation of the control data based on the calculated model, or to define the contact pattern area again, until the represented model of the modified tooth flank geometry corresponds to a desired, modified tooth flank geometry prior to generating the control data based on the desired, modified tooth flank geometry.

In some preferred examples, the method also encompasses the determination of a load value. In some preferred examples, the method also comprises the representation of the expected contact pattern when the tooth flank is rolled with a mating flank under a load that corresponds to the determined load value on the model of the modified tooth flank geometry.

This has the advantage that a specific load value, for example one corresponding to the future intended operation of the workpiece, can be determined while it is rolled with the mating flank, wherein the expected contact pattern when the tooth flank is rolled with a mating flank under a load corresponding to this determined load value, is represented in the model of the modified tooth flank geometry, so that it is possible to check whether the expected contact pattern at the determined load value corresponds to the size, structure and/or position of the desired contact pattern. This can be approximated, for example, by representing height lines on the modified tooth flank geometry when representing the modified tooth flank geometry; these height lines denote the variation and/or the modification as compared with the predefined tooth flank geometry. Height lines of this kind can give an approximate indication of a contact pattern behavior under increasing loads.

In some preferred examples, the step of defining the tooth flank geometry comprises the step during which toothing data is predefined. In some preferred examples, the step of predefining tooth flank geometry encompasses the additional step of calculating the predefined tooth flank geometry based on predefined toothing data.

In some preferred examples, the toothing data comprises data, which denotes the size and shape of the workpiece, data which denotes the type of design of the toothing, in particular a design from the designs of spur gear, bevel gear, crown wheel, cylindrical gear and toothed rack, data which denotes a type of toothing, in particular a toothing shape from the toothing shapes of spur toothing, helical toothing, curved toothing, spiral toothing, data which denotes a tooth flank profile shape, in particular a tooth flank profile shape from the tooth flank profile shapes of involute profile, cycloid profile and circular profile, data which denotes a size and shape of a tooth geometry of the toothing, and/or data which denotes the number of teeth in the gearing.

This has the advantage that the predefined tooth flank geometry can be easily be defined by defining of toothing data, wherein very little toothing data need be defined in order to define the tooth flank geometry. For example, the toothing data can comprise data which denotes the size and shape of the workpiece, data which denotes a type of design of the toothing, thus for example and in particular, whether we are dealing with a spur gear, bevel gear, crown wheel, cylindrical gear or toothed rack. Furthermore, toothing data can be defined as data which denotes the designed type of toothing, for example, whether a spur toothing, helical toothing, curved toothing, spiral toothing is to be produced. Furthermore, the toothing data can contain data which denotes a desired, perhaps mathematical tooth flank profile shape, in particular for example, an involute profile, cycloid profile or circular profile. Furthermore, the toothing data can also contain data which denotes the size and shape of the tooth geometry of the toothing and/or data which denotes a quantity of teeth of the toothing.

In particular, the toothing data preferably, but not necessarily, denotes data which makes it possible to calculate the mathematically accurate, desired tooth flank geometry, in particular by calculating a model of the predefined tooth flank geometry or even calculation of a model of the finished workpiece with toothing which has the predefined tooth flank geometry.

According to a second aspect of some examples disclosed herein, a method is proposed for generating control data for the production of a toothed workpiece with the following steps: Definition of toothing data, calculation of a model of the workpiece based on the predefined toothing data, comprising the step of calculation of a predefined tooth flank geometry based on the predefined toothing data, and generating control data for the production of the workpiece, comprising the step of generating control data for formation of a tooth flank of the toothing on the workpiece in accordance with a method according to the first aspect of disclosed examples described above, preferably, but not necessarily, in conjunction with one or a plurality of examples described above of methods according to the above-described first aspect of disclosed examples.

According to a third aspect of some examples disclosed herein, a method is disclosed for generating control data for the formation of a tooth flank by milling a workpiece on a numerically controlled machine tool with at least 5 axes, in particular on a milling machine, on a universal milling machine or at a processing center, through successive passes with a milling cutter of a machine tool, based on the generated control data, wherein the control data are generated preferably, but not necessarily, according to a method in accordance with the first or second aspect of the disclosed examples. The device comprises: A first input means for predefining tooth flank geometry, a second input means for determining a contact pattern area on the predefined tooth flank geometry, a third input means for determining parameters for modifying the predefined tooth flank geometry and a means of generating control data for the generation of control data based on tooth flank geometry modified depending upon the defined contact pattern area and of the defined parameters.

According to a fourth aspect of some examples disclosed herein, a device is disclosed for generating control data for the production of a toothed workpiece in accordance with a method of the second aspect described above, and comprising: An input means for defining of toothing data, a means for calculation of a model for the calculation of a model of the workpiece based on the predefined toothing data, comprising the step of calculation of a predefined tooth flank geometry based on the predefined toothing data, and a means of generating control data for the generation of control data for the production of the workpiece, comprising the step of generating control data for formation of a tooth flank of the toothing on the workpiece in accordance with a method according to the first aspect of the disclosed examples described above, preferably, but not necessarily, in conjunction with one or a plurality of the examples described above of a method according to the above-described first aspect of the disclosed examples.

Disclosed examples described below relate to apparatus according to the above-described third and fourth aspects.

In some preferred examples, the device comprises a model calculation means for calculating a model of the modified tooth flank geometry based on the predefined tooth flank geometry, of the defined contact pattern area and of the defined parameters. The model calculation means can be included in the means of generating control data, or can be provided as a separate means.

In some preferred examples, the device and/or the second input means for determining the contact pattern area comprises input means for determining a shape of the contact pattern area, input means for determining a position of the contact pattern area on the tooth flank, input means for determining a size of the contact pattern area, and/or input means for determining an alignment of the contact pattern area on the tooth flank.

In some preferred examples, the device and/or the third input means of determining of parameters for modifying the predefined tooth flank geometry comprises input means for determining at least one of the specific reduction parameters on at least one determined reduction position on the predefined tooth flank geometry. In some preferred examples, the device and/or the third input means for determining parameters for modifying the predefined tooth flank geometry also comprises input means for determining at least one or a plurality of the reduction positions (2a to 2h) on the predefined tooth flank geometry (5).

In some preferred examples, the device comprises a representation means for representing of a model of the modified tooth flank geometry, for representing of a model of the predefined tooth flank geometry, for representing the blank component geometry of the workpiece which denotes the geometry of the blank workpiece before production of the toothing, and/or for representing of the finished component geometry of the workpiece which denotes the geometry of the finished workpiece after production of the toothing.

In some preferred examples, the device comprises the input means for defining and/or determining toothing data, or the first input means preferably, but not necessarily, also has an input means for defining of data which denotes a size and shape and/or geometry of the workpiece, input means for the definition of data which denotes a type of design of the toothing, in particular a design from the designs of spur gear, bevel gear, crown wheel, cylindrical gear and toothed rack, input means for defining of data which denotes a toothing shape, in particular a toothing shape from the toothing shapes of spur toothing, helical toothing, curved toothing, spiral toothing, input means for the definition of data which denotes a tooth flank profile shape, in particular a tooth flank profile shape from the tooth flank profile shapes of involute profile, cycloid profile and circular profile, input means for the definition of data which denotes a size and shape of a tooth geometry of the toothing and/or input means for the definition of data which denotes a quantity of teeth of the toothing.

According to a fifth aspect of examples disclosed herein, a numerically controlled machine tool with at least 5 axes, in particular a milling machine, universal milling machine or processing center is proposed for milling cutting of a workpiece through successive passes with a milling cutter on the machine tool based on the generated control data, which comprises a device for the generation of control data according to the third or fourth aspect.

According to a sixth aspect of examples disclosed herein, a computer program product is proposed which comprises a computer-readable medium and a computer program recorded thereon, wherein the computer program is saved in the form of a sequence of states which correspond to commands which are designed so as to be processed by a data processing means of a data processing device, so that a device for generating control data is formed according to the third or fourth aspect.

FIG. 1 shows schematically an example tooth flank $1c$ of a tooth $1$ of a toothing of a workpiece under manufacture, here for example, a spur toothing. The tooth $1$ in FIG. 1 has a tooth head $1b$ and a tooth root $1a$, wherein extending between tooth head $1b$ and tooth root $1a$ there is a tooth flank $1c$ which is denoted by the dashed line and the mating flank rolls thereon during operation of said workpiece having the toothing. Tooth flank $1c$ is often also denoted as the toothing-active region of the side of the tooth $1$.

The tooth flank $1c$ in FIG. 1 here corresponds, for example, to the region of tooth $1$ which has an exact tooth flank profile corresponding to mathematically predefined tooth flank geometry. This means that a mating flank having a correspondingly mathematically accurate tooth flank geometry, when rolling along the tooth flank $1c$ without applied load, essentially contacts the entire region of the tooth flank $1c$ and/or comes into contact therewith (corresponding to a line and/or to a curve which is moved along the tooth flank $1c$ during the traversing from tooth root $1a$ to tooth head $1b$ or from tooth head $1b$ to tooth root $1a$, depending on the direction of the traverse). The tooth flank $1c$ in FIG. 1 (dashed line in FIG. 1) is thus defined essentially by the contact pattern when traversing of the mathematically accurate tooth flank $1c$ with a mathematically accurate mating flank with no load, that is, for load-free traversing.

In the regions of the tooth head $1b$ and of the tooth root $1a$, the shape of the tooth can differ from the predefined tooth flank geometry and/or from the defined tooth flank profile, so that this region hereinafter is not counted with the tooth flank $1c$, since it is assumed hereinafter that the profile of the tooth flank $1c$ contains the tooth flank profile defined as being toothing-active.

It is possible to calculate a geometric model of the tooth flank $1c$, e.g. by using a CAD system, provided the needed toothing data is defined and/or determined. In this regard the following data may be useful, in particular, to be able to calculate a mathematic or numerical model of the tooth flank $1c$.

Data which denotes a size and shape of the overall workpiece before and/or after processing (e.g., data for calculation of a rough blank and/or finished component geometry and/or of a model of a rough blank and/or finished component geometry), Data which denotes a type of design of the toothing, thus in particular a design from the possible designs of spur gear, bevel gear, crown wheel, cylindrical gear and toothed rack, or others.

Data which denotes a kind of toothing, in particular a toothing shape from the possible toothing shapes of spur toothing, helical toothing, curved toothing, spiral toothing, or others, Data which denotes a tooth flank profile shape, in particular a tooth flank profile shape from the tooth flank profile shapes of involute profile, cycloid profile and circular profile, or others, Data which denotes a size and/or shape of a tooth geometry of the toothing, in particular for example, tooth height, tooth width, or similar parameters, and/or Data which denotes a number of teeth of the toothing.

Furthermore, it may be necessary, for example in the case of bevel gears and/or corresponding pinions, to designate or to define whether the gear being produced is to be designed as left- or right-rotating, whether the axes of the bevel gear and of the pinion are to have an axial displacement, and if necessary also data which denotes the shape, size and any other surface characteristics of the opposing gear.

The data specified above facilitates calculating a mathematically accurate model of a toothed workpiece with tooth flanks or a tooth flank $1c$ which corresponds to an accurate mathematical tooth flank geometry which has in particular the precise profile shape as the defined tooth flank profile, for example, an involute profile shape.

Proceeding from a model calculated in this manner, for example, a model calculated using a CAD system, it is additionally possible—based on the model—to calculate path data, for example, to generate an NC program, e.g., using a CAM- or CAD/CAM system, comprised of control data to be used to control a tool such as an end mill cutter or other numerically controlled machine tool with 5 axes, for example, a milling machine, a universal milling machine or a universal processing center, in order to produce the tooth flank $1c$ on the workpiece through successive passes of the milling cutter along the machining paths successively or in lines. In this regard we refer in particular to the teaching of DE 10 2009 008 124, wherein it is described how such machining paths are preferably, but not necessarily, created based on a predefined tooth flank geometry.

Now accordingly the disclosed examples provide that the control data is not created based on a model of a predefined tooth flank geometry which has a mathematically accurate shape of the tooth flank profile or tooth flank geometry, but rather according to the disclosed examples, before or during the creation of the control data, the model is modified and/or modified in order to model a contact pattern on the tooth flank in an advantageous manner even before the initial processing of the workpiece. Therefore in a simple and efficient manner a specific, desired contact pattern behavior during subsequent operation of the toothed workpiece can be attained, without the workpiece having to be reworked for modeling of the contact pattern after the initial processing on the machine tool.

Modeling of the contact pattern and/or variation of the predefined tooth flank geometry for modeling of a contact pattern will be explained below with reference to FIGS. 2 to 5B according to some of the disclosed examples.

Figure 2:
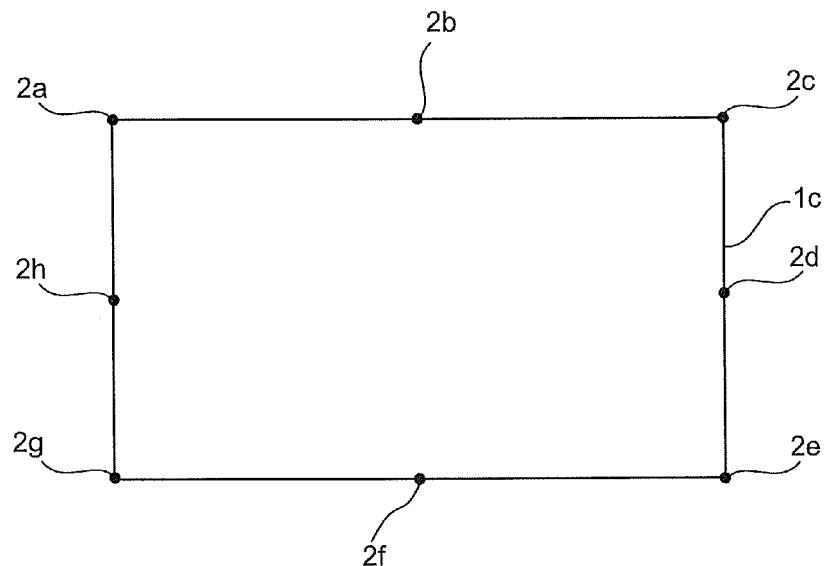
FIG. 2 shows an example, schematic representation of a tooth flank.
Figure 4A:
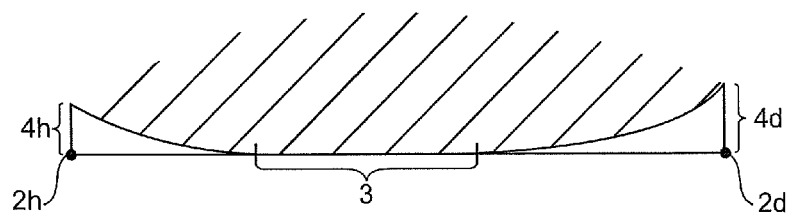
FIG. 4A shows schematically a cross section through the reduction positions $2h$ and $2d$, while ignoring the profile curvature of the predefined tooth flank geometry.
Figure 4B:
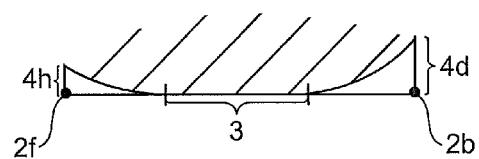
FIG. 4B shows schematically a cross section through the reduction positions $2f$ and $2b$, while ignoring the profile curvature of the predefined tooth flank geometry.
Figure 4C:
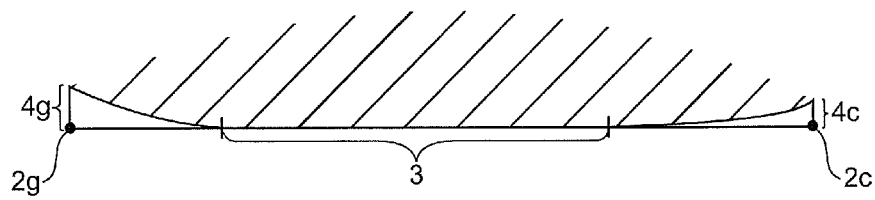
FIG. 4C shows schematically a cross section through the reduction positions $2g$ and $2c$, while ignoring the profile curvature of the predefined tooth flank geometry.

FIG. 2 shows an abstract representation of the tooth flank $1c$ as a simple rectangle. We are dealing here with a simplified, abstract representation and/or modified representation in which the curvature of the tooth flank $1c$ is not taken into account, in accordance with the defined tooth flank profile and/or in accordance with the predefined tooth flank geometry. Thus the disclosed modification and/or variation of the tooth flank geometry can be illustrated more easily. A rectangle without curvature, as illustrated in FIG. 2, thus here means an abstract representation of the tooth flank $1c$, wherein the curvature of the abstract representation of the tooth flank $1c$ shown in FIGS. 4A to 4C represents an additional curvature in addition to the curvature of the predefined tooth flank geometry.

Figure 3:
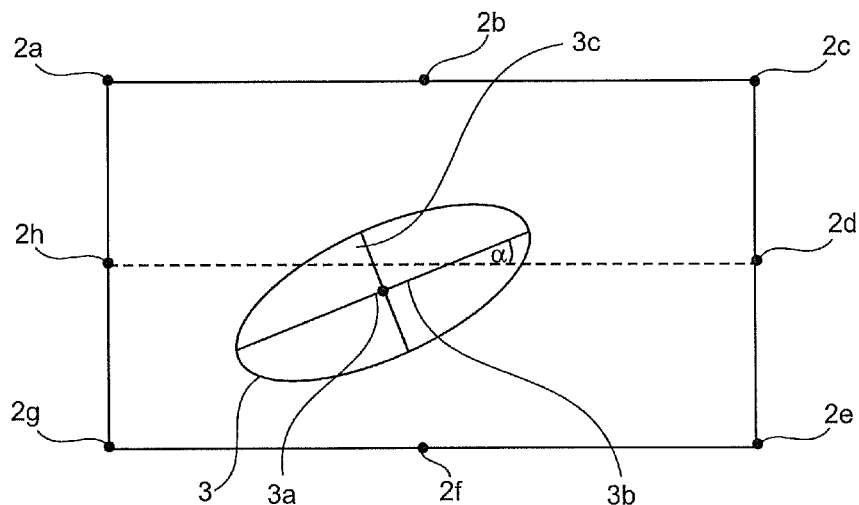
FIG. 3 shows an example, schematic representation of a tooth flank with a contact pattern area and reduction positions determined according to some examples disclosed herein.

FIG. 3 shows an exemplary, abstract representation of the tooth flank $1c$ from FIG. 2, wherein according to some of the disclosed examples, a contact pattern area 3 and reduction positions $2a$ to $2h$ are determined on the tooth flank $1c$.

For example, the defined contact pattern area 3 in FIG. 3 is determined or defined as an ellipse or as ellipsoid. However, the examples disclosed herein are not restricted to ellipsoid contact pattern areas, but rather furthermore the contact pattern area can be determined in any shape, for example, with any particular geometry or corresponding to a basic geometric shape such as a rectangle, circle, trapezoid or corresponding to other two-dimensional geometric shapes.

The size of the contact pattern area 3 is determined or defined, for example, by the primary axes $3d$ and $3c$ and the positioning of the defined contact pattern area 3 on the tooth flank $1c$ is determined or defined herein by the point of intersection $3a$ of the primary axes $3d$ and $3c$.

Furthermore, an alignment of the defined contact pattern area 3 as per this exemplary embodiment can be determined by the angle α which denotes an alignment of the primary axis $3b$ of the ellipsoidal, defined contact pattern area 3.

Reduction positions $2a$ to $2h$ are determined on the outside of the tooth flank $1c$. The reduction positions $2a$, $2c$, $2e$ and $2g$ herein are positioned, for example, at the corners of the tooth flank $1c$ and the reduction positions $2b$, $2d$, $2f$ and $2h$ are positioned here in the middle between two neighboring corners of the tooth flank $1c$. The reduction positions $2a$ to $2h$ and/or also the quantity thereof can be defined within the program or can be determined by a user of a device for creation of control data in accordance with examples disclosed herein.

Accordingly, disclosed examples provide that reduction parameters are determined at the specific reduction positions $2a$ to $2h$, and accordingly the tooth flank geometry is to be reduced at the specific reduction positions in comparison to the predefined tooth flank geometry.

Furthermore, disclosed examples also provide that the tooth flank geometry is not modified or not modified in the region of the defined contact pattern area 3. The definition of reduction parameters at the reduction positions $2a$ to $2h$ according to the disclosed examples thus results only in a reduction of the tooth flank geometry in the region of the tooth flank $1c$ which is located outside of the contact pattern area 3 defined and/or determined on the tooth flank $1c$. In other words, in the interior of the defined contact pattern area 3 mathematically accurate tooth flank geometry can be retained which corresponds to the predefined tooth flank geometry. Thus it can be assured that in spite of the reduction of the tooth flank geometry outside of the defined contact pattern area 3, during load-free rolling of the tooth flank $1c$ with a mating flank, at least one contact pattern is produced having the size, position and structure which corresponds to the defined contact pattern area 3.

Whereas during load-free rolling of the tooth flank $1c$ with a mating flank before the variation of the tooth flank geometry, a contact pattern would be produced essentially across the entire region of the tooth flank $1c$, according to the disclosed examples a contact pattern can already be determined or defined during load-free rolling of the flanks, wherein the size, shape and/or structure can be selected or defined at random.

For modeling of the contact pattern under load, the disclosed examples provides for determining of the specific reduction parameters at the specific reduction positions $2a$ to $2h$, and accordingly the tooth flank and/or the tooth flank geometry is determined outside of the defined contact pattern area 3.

As an example, the reduction of the tooth flank geometry is illustrated below with reference to FIGS. 4A to 4C. For example, FIG. 4A shows a cross section through the reduction positions $2h$ and $2d$ from FIG. 3, wherein at reduction positions $2h$ and $2d$ the specific reduction parameters $4h$ and $4d$ are determined which define a reduction of the tooth flank geometry. In addition, the region of the defined contact pattern area 3 is illustrated in the interior, wherein it is evident in FIG. 4A that in the interior of the defined contact pattern area 3 the tooth flank geometry is not modified, wherein toward the outside at the specific reduction positions $2h$ or $2b$, a continuous reduction of the tooth flank geometry is done in such a way that at reduction positions $2h$ and $2d$, reductions of the tooth flank geometry can be obtained corresponding to the defined reduction parameters $4h$ and $4d$.

Analogously, FIGS. 4B and 4C show the reduction of the tooth flank geometry along the cross section between reduction positions $2f$ and $2b$ (FIG. 4b) and the reduction positions $2g$ and $2c$ (FIG. 4C), wherein corresponding reduction parameters $4f$, $4d$, $4g$ and $4c$ are determined.

As is evident in FIGS. 4A to 4C, according to this illustrated examples of the disclosed examples, the reduction of the tooth flank geometry is performed such that the transitions—especially at the intersection regions to the defined contact pattern area 3—are implemented consistently and/or tangentially, and especially with uniform transitions. The reduction from the interior defined contact pattern area 3 down to the determined reduction positions likewise takes place consistently, in particular with a consistent curvature.

As was already mentioned above, in FIGS. 3 to 4C the curvature of the already defined, mathematically accurate tooth flank geometry of tooth flank $1c$ was omitted or was not illustrated in order to simplify the representation. The following FIGS. 5A and 5B show how the modeling of the contact pattern takes place before creation of the control data as per some of the disclosed examples, with reference to the actual tooth flank geometry under consideration of the profile curvature.

Figure 5A:
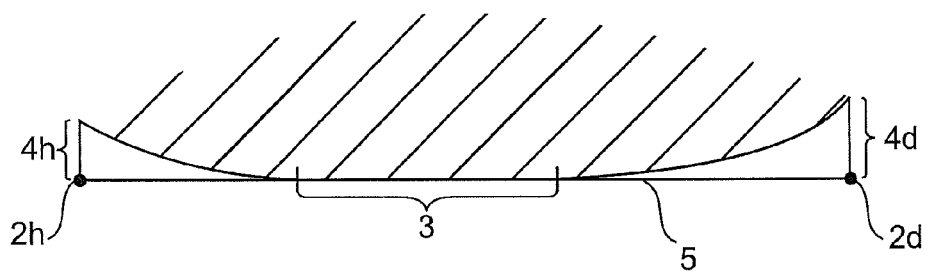
FIG. 5A shows schematically a cross section through the reduction positions $2h$ and $2d$, which takes account of the profile curvature of the predefined tooth flank geometry.

FIG. 5A shows a cross section through the reduction positions 2h and 2d on the tooth flank 1c, wherein the reference number 5 denotes the predefined tooth flank geometry and reference number 6 denotes the changed tooth flank geometry after determining of the contact pattern area 3 and determining of the reduction parameters 4h and 4d at the determined reduction positions 2h and 2d. Since in the present example we are dealing with a spur toothing and the reduction positions 2h and 2d are determined at the same height of the tooth (essentially at the level of the semi-circle), the line of intersection through the predefined tooth flank geometry 5 is a straight line in FIG. 5A.

The modified tooth flank geometry however, has a reduction at the reduction positions 2h and 2d corresponding to the defined reduction parameters 4h and 4d, wherein the reduction in the case of a preferably, but not necessarily, consistent curvature decreases toward the contact pattern area 3 determined in the interior, and simultaneously passes into contact pattern area 3, especially in a tangential manner. According to the disclosed examples, the tooth flank geometry in the region of the determined contact pattern 3 is not modified with respect to the progression of the predefined tooth flank geometry 5.

Figure 5B:
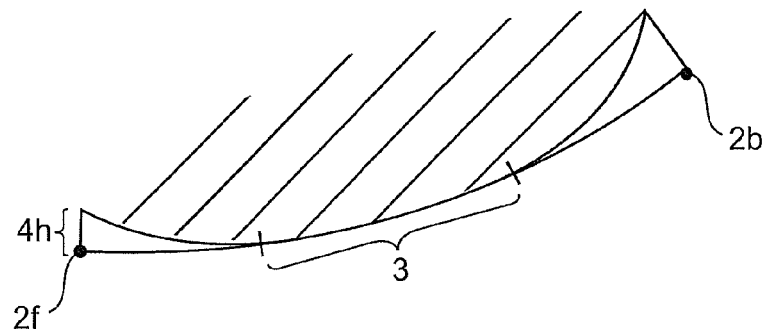
FIG. 5B shows schematically a cross section through the reduction positions $2f$ and $2b$, which takes account of the profile curvature of the predefined tooth flank geometry.

Conversely, FIG. 5B shows a cross section along the tooth profile between the reduction positions 2b and 2f, wherein the profile shape corresponds to an involute shape, in this example case. This means that the line of intersection of the predefined tooth flank geometry 5 in FIG. 5B follows an involute profile in this example. In turn, according to the defined reduction parameters 4b and 4f variations of the tooth flank geometry are performed at the reduction positions 2b and 2f, so that modified tooth flank geometry 6 is obtained. In turn, in the region of the defined contact pattern area 3 the tooth flank geometry 6 is not modified in comparison to the predefined tooth flank geometry 5, wherein the modified tooth flank geometry 6 has a consistent, in particular a tangential transition at the outer flank of the defined contact pattern area 3.

Now based on the modified tooth flank geometry a model of the modified tooth flank geometry can be created, and/or a model of the toothed workpiece having the modified tooth flank geometry. Then based on this model, as already known from DE 10 2009 008 124 control data can be created to be used to manufacture the workpiece or the tooth flank 1c, in that a milling cutter such as an end mill cutter of the machine tool, for example, cuts the tooth flank or tooth flanks onto the workpiece in accordance with the control data through successive milling passes.

The workpiece produced from this milling cutting then has tooth flanks—immediately after the production—which correspond to the modified tooth flank geometry, so that the contact pattern is modeled right before creation of the control data and before the processing or manufacture, and a subsequent re-processing, for example by lapping or grinding is not necessary.

In particular, the reduction parameters and the defined contact pattern area 3 can be determined in such a way that the contact pattern will have a desired contact pattern during traversing with a specific load on the mating flank, in particular with the desired size, position and shape. The examples disclosed herein thus make it possible in a simple and efficient manner—without any required re-processing of the workpiece and even before creation of the control data—to model a contact pattern on the tooth flank such that during load-free rolling with the mating flank and/or when traversing the tooth flank with a mating flank under load, for example, at a specific load value, a desired contact pattern can be obtained.

Figure 6A:
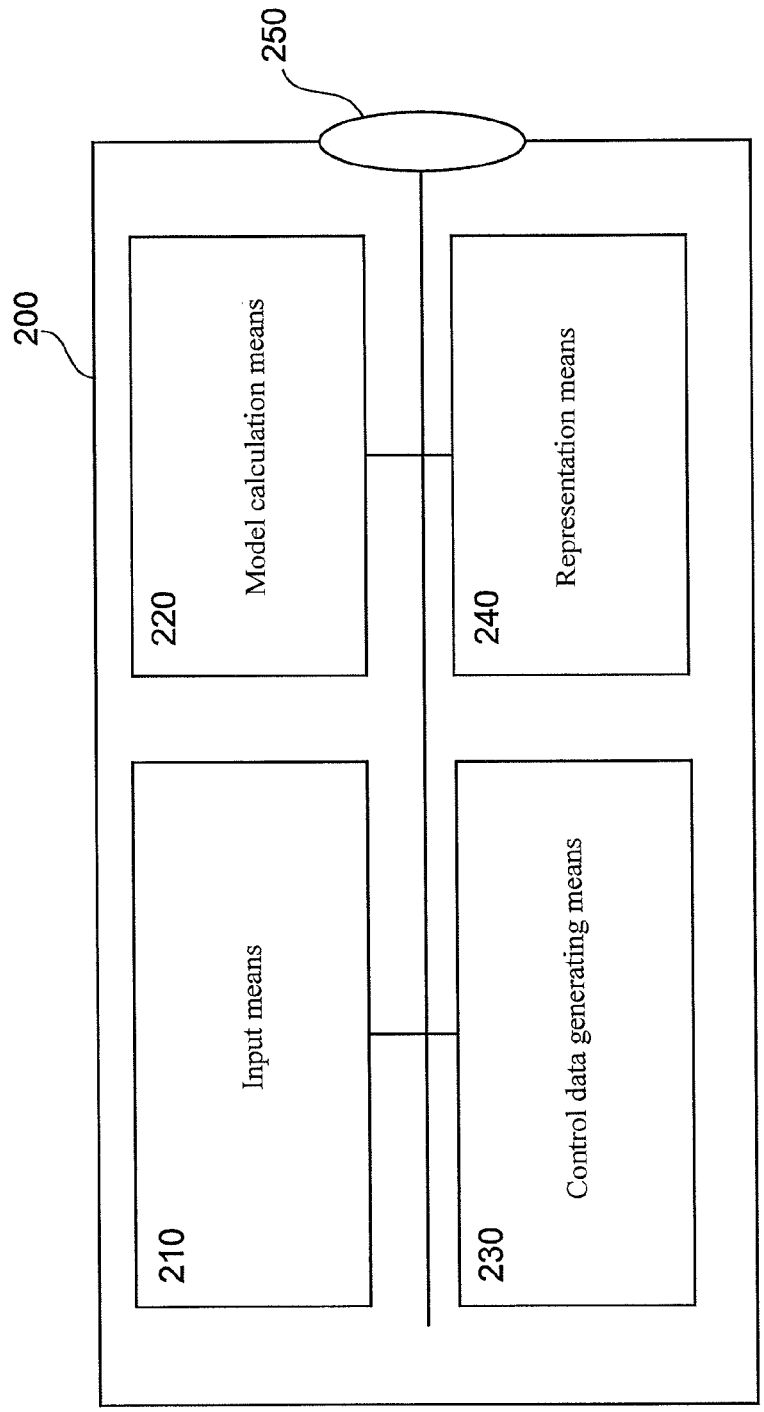
FIG. 6A shows schematically a device for generating control data according to some examples disclosed herein.

FIG. 6A shows schematically a device 200 for generating control data for the production of a toothed workpiece or for creation of control data according to some of the disclosed examples. The device 200 is suitable for generating control data for the formation of a tooth flank by milling a workpiece on a numerically controlled machine tool with at least 5 axes, in particular on a milling machine, on a universal milling machine or at a processing center, through successive passes with a milling cutter of a machine tool, based on the generated control data. The device can be part of a machine tool, i.e. included in the machine tool or can be at least secured thereon, or can even be produced separately from the machine tool. The device can be formed by one or a plurality of data processing means such as by one or several computers or computer-like data processing means.

The device 200 comprises an input means 210 for the input of data, parameters, information or such, in particular for defining of toothing data and a model calculating means 220 for calculation of a model of the workpiece based on the defined toothing data, in particular for calculation of a model of a predefined tooth flank geometry based on the defined toothing data. In addition, the device 200 comprises a means of generating control data 230 for the generation of control data for the production of the workpiece, in particular for generating control data for formation of a tooth flank of the toothing on the workpiece on the machine tool numerically controlled based on the control data.

In addition, the device 200 according to this example comprises a representation means 240 for representing of a model of the modified tooth flank geometry, for representing of a model of the predefined tooth flank geometry, for representing the blank component geometry of the workpiece which denotes the geometry of the blank workpiece before production of the toothing, and for representing of the finished component geometry of the workpiece which denotes the geometry of the finished workpiece after production of the toothing.

In addition, the device 200 comprises an interface means 250 used to connect and/or to join the device, e.g., for transmission of control data to the machine tool and/or to the machine tool control device of the machine tool, for example, by a cable link or even through wireless connection such as WLAN. The interface means can also be suitable for saving control data created by the device 200 on a memory medium, e.g., on a USB memory stick or a flash memory card or other memory media, wherein the memory medium can then be connected to the machine tool to transfer the control data to the machine tool.

Figure 6B:
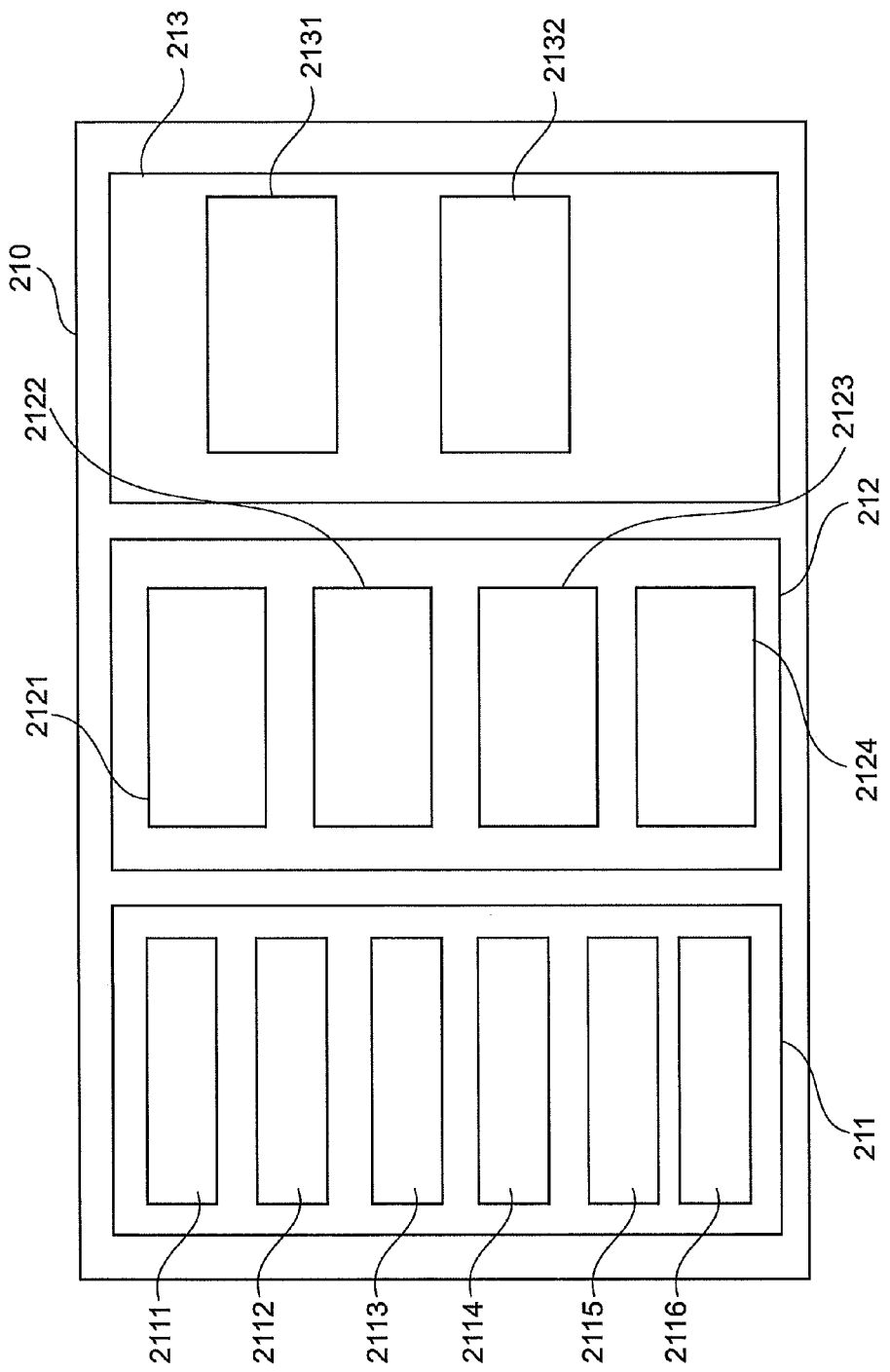
FIG. 6B shows schematically an input means of the device from FIG. 6A.

FIG. 6B shows schematically an example of the input means 210 of the device 200 from FIG. 6A. The input means 210 comprises a first input means 211 for determining or defining of tooth flank geometry, a second input means 212 for determining or defining of a contact pattern area on the predefined tooth flank geometry and a third input means 213 for defining or determining of parameters for variation of the predefined tooth flank geometry.

The first input means 211 for defining and/or determining of tooth flank geometry or for determining of an overall workpiece geometry comprises an input means 2111 for defining of data which denotes a size and shape and/or geometry of the workpiece, input means 2112 for the definition of data which denotes a type of design of the toothing, in particular a design from the designs of spur gear, bevel gear, crown wheel, cylindrical gear and toothed rack, input means 2113 for defining of data which denotes a toothing shape, in particular a toothing shape from the toothing shapes of spur toothing, helical toothing, curved toothing, spiral toothing, input means 2114 for the definition of data which denotes a tooth flank profile shape, in particular a tooth flank profile shape from the tooth flank profile shapes of involute profile, cycloid profile and circular profile, input means 2115 for the definition of data which denotes a size and shape of a tooth geometry of the toothing and input means 2116 for the definition of data which denotes a quantity of teeth of the toothing.

The second input means 212 for determining of the contact pattern area comprises an input means 2121 for determining of a shape of the contact pattern area, an input means 2122 for determining of a position of the contact pattern area on the tooth flank, an input means 2123 for determining of a size of the contact pattern area and an input means 2124 for determining of an alignment of the contact pattern area on the tooth flank. The third input means 213 for defining or determining of parameters for variation of the predefined tooth flank geometry comprises an input means 2131 for determining or defining at least one of a specific reduction parameter on at least one determined reduction position on the predefined tooth flank geometry, and an input means 2132 for determining or defining of one or a plurality of reduction positions on the predefined tooth flank geometry.

Based on the toothing data input or to or specified for the input means 210, the model calculation means 220 can calculate a model of the toothed workpiece and in particular a model of the specified or modified tooth flank geometry or tooth flank geometry(s). Then based on the calculated model, the control data generation means 230 calculated path data for the milling cutter for successive or specific, milling production of the tooth flank corresponding to the changed tooth flank geometry. Based on the calculated path data it is possible to generate the control data numerically or automatically, e.g. in the form of an NC program.

Figure 7:
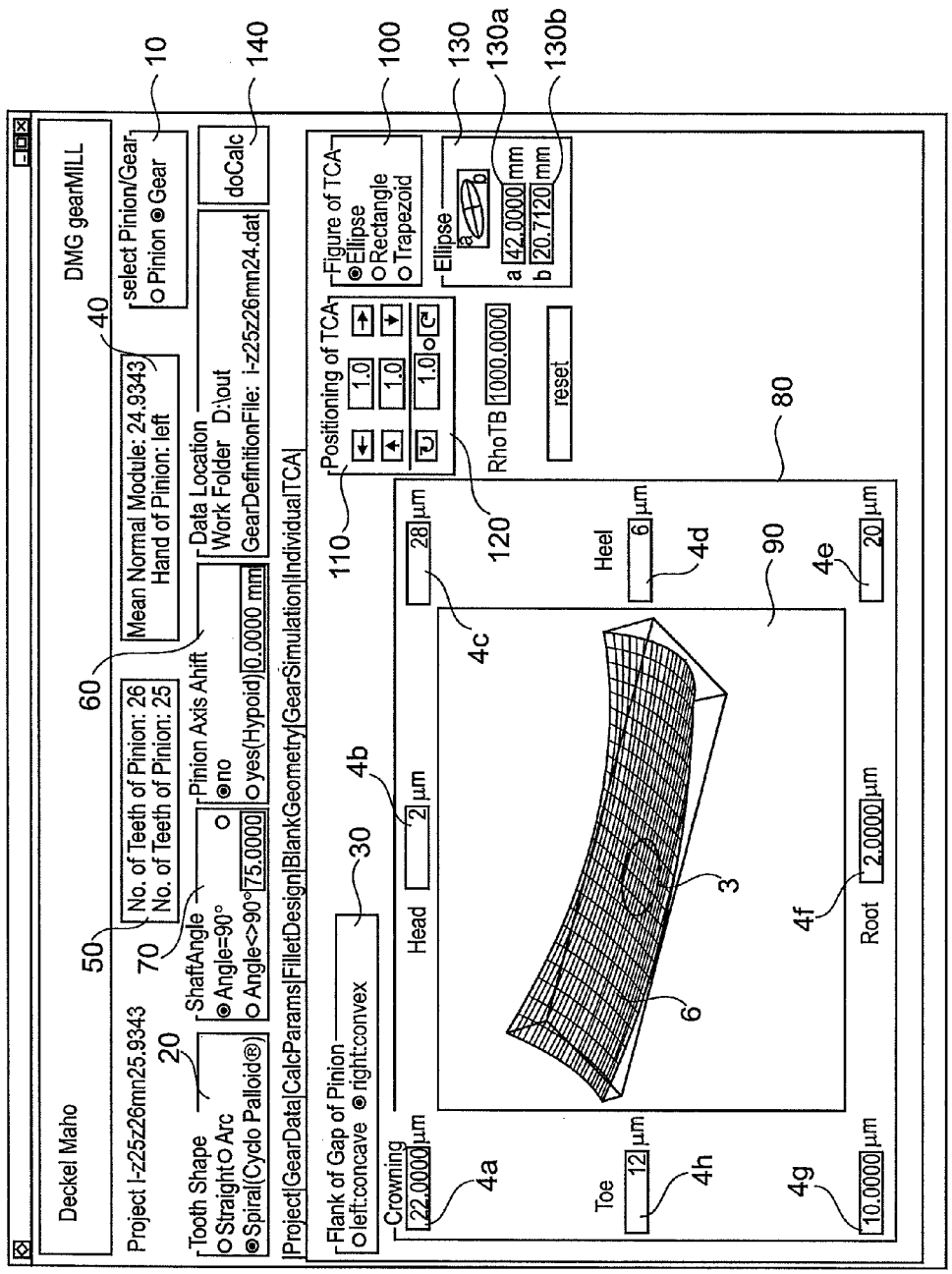
FIG. 7 shows an exemplary graphic surface of a representation means of a device for generating control data according to some examples disclosed herein.

FIG. 7 shows an example graphic, in particular interactive, surface of a representation means 210 of a device 200 for generating control data according to some disclosed examples. For example, FIG. 7 shows that the workpiece is already specified as being a bevel gear, that is, the design is previously defined as a bevel gear. In an input- and display region 10 a user can select and/or specify whether toothing data is to be defined or determined for a bevel gear or for a pinion belonging to a previously determined or defined bevel gear. In an input- and display region 20 a user can select and/or specify whether the bevel gear being produced is to have a spur toothing, spiral toothing or spiral toothing. That is, the toothing shape of the bevel gear can be selected. In an input- and display region 30 a user can select and/or specify whether the bevel gear being produced is to be designed for a pinion with left concave or right convex tooth gap flank. The handedness of the pinion is displayed in a display region 40. The previously determined number of teeth of the bevel gear appears in a display region 50. In an input- and display region 60 the user can select or define whether the axis of the bevel gear being produced is to be shifted relative to the axis of the pinion during operation. If an axial shift is to be used, then in addition the amount of the axis shift (e.g. in mm-units) can be defined in the input- and display region 60. In an input- and display region 70 the user can select or define whether the two axes of the bevel gear and of the pinion are to form a right angle, and if an angle differing from 90° is used, then the size of the angle can be input and/or defined.

The user can define or determine the reduction parameters $4a$ to $4h$ (e.g., in mm-units) in an input- and display region 80. The reduction positions $2a$ to $2h$ according to this illustrated example are already specified in accordance with the positions on the tooth flank $1c$ illustrated in FIG. 2. The tooth flank geometry 6 modified or modified in accordance with the defined contact pattern area 3 and with the defined reduction parameters $4a$ to $4h$ is presented in a perspective illustrated in a display region 90 (in an abstract manner analogous to FIGS. 4A to 4C, i.e., without representation of the curvature of the predefined tooth flank geometry). The contact pattern area 3 determined on the tooth flank is likewise illustrated. The perspective illustration of the modified or modified tooth flank geometry 6 can be rotated in order to visually verify the modified or modified tooth flank geometry 6 from different viewing directions.

To determine and/or to define the contact pattern area 3 on the tooth flank, the user can select from various basic shapes in an input- and display region 100 in order to define the shape of the contact pattern area 3. For example, the user can select from the basic shapes of ellipse, rectangle and trapezoid in FIG. 7. In an input- and display region 110 the user can define or determine the vertical and horizontal positioning of the contact pattern area 3 on the tooth flank. The alignment of the defined contact pattern area 3 can be defined in an input- and display region 12 (e.g. as angular alignment relative to the horizontal midline of the tooth flank). Finally, the user can define the size of the contact pattern area in an input- and display region 130. For example, since an elliptical shape is defined in FIG. 7 in the input- and display region 100 for contact pattern area 3, the user can define the size of the contact pattern area 3 by defining the length of the semi-axes a and b of the ellipse in the particular input regions $130a$ and $130b$.

Once the toothing data is determined or defined, the user can operate the input region 140 to start the calculate the model of the modified tooth flank geometry or to generate the control data based on the input information, including a determination of the contact pattern area and a determination of the parameters for modifying the tooth flank geometry.

In summary, examples disclosed herein improve and further simplify the processing and/or the production of toothed workpieces, and in addition the disclosed examples facilitate expanding the options for milling a workpiece on a numerically controlled machine tool with at least 5 axes, in particular on a universal machine tool such as, for example, a milling machine, a universal milling machine or a processing center. In particular, the disclosed examples make it possible to provide a method and a device for generating control data which expand the options of the newly developed method of producing a toothed workpiece on a machine tool, in particular on a universal machine tool, through successive and/or specific cutting of a tooth flank on the workpiece using a milling cutter such as an end mill cutter or similar milling cutter, based on the generated control data. Finally, the disclosed examples facilitate the production of a toothed workpiece such that the at least one tooth flank of the workpiece can be produced in a simple and efficient manner with a desired contact pattern, in particular without any required re-processing.

What is claimed is:

1. A method for generating control data for the formation of a tooth flank on a workpiece at a numerically controlled machine tool with at least 5 axes by using a milling cutter, the method comprising:

defining a tooth flank geometry, defining a contact pattern area on the predefined tooth flank geometry, the contact pattern area being a two-dimensional partial area of a two-dimensional surface area of the predefined tooth flank geometry, defining parameters to vary the predefined tooth flank geometry, modifying the predefined tooth flank geometry to determine a modified tooth flank geometry based on the defined contact pattern area and the defined parameters, and generating the control data on the basis of the modified tooth flank geometry, wherein the generated control data is configured to control the numerically controlled machine tool to produce the tooth flank on the workpiece according to the modified tooth flank geometry by milling through successive passes of the milling cutter along machining paths successively or in lines based on the generated control data.

2. A method according to claim 1, wherein the generating of the control data comprises calculating a model of the modified tooth flank geometry based on the predefined tooth flank geometry, the defined contact pattern area and the defined parameters.

3. A method according to claim 1, wherein for the modified tooth flank geometry, a region corresponding to the defined contact pattern area is unchanged in comparison to the predefined tooth flank geometry, wherein the modified tooth flank geometry differs from the predefined tooth flank geometry only outside of the defined contact pattern area.

4. A method according to claim 1, wherein the predefined tooth flank geometry corresponds to a first tooth flank geometry with a maximum contact pattern across the tooth flank during load-free rolling of the tooth flank with a mating flank.

5. A method according to claim 1, wherein the defined contact pattern area after modifying the predefined tooth flank geometry defines a contact pattern during load-free rolling of the tooth flank with a mating flank, such that the modified tooth flank geometry corresponds to a second tooth flank geometry of the tooth flank which has a contact pattern corresponding to the defined contact pattern area during load-free rolling with the mating flank.

6. A method according to claim 1, wherein the defined contact pattern area is defined in such a way that a contact pattern with a desired size, structure and position results from the load-free rolling of the tooth flank with a mating flank.

7. A method according to claim 6, wherein the defining of the defined contact pattern area comprises at least one of:
determining a shape of the contact pattern area,
determining a position of the contact pattern area on the tooth flank,
determining a size of the contact pattern area, or
determining an alignment of the contact pattern area on the tooth flank.

8. A method according to claim 7, wherein the shape of the contact pattern area is determined as circular, elliptical, rectangular, square or trapezoidal in shape.

9. A method according to claim 1, wherein the parameters to vary the predefined tooth flank geometry are defined in such a way that a contact pattern with a desired size, structure and position results from traversing of the tooth flank with a mating flank under load.

10. A method according to claim 1, wherein the defining of the parameters to vary the predefined tooth flank geometry comprises defining at least one specific reduction parameter on at least one reduction position on the predefined tooth flank geometry.

11. A method according to claim 10, wherein the modified tooth flank geometry, with respect to the predefined tooth flank geometry, is reduced at each of the at least one reduction position corresponding to the at least one specific reduction parameter.

12. A method according to claim 10, further comprising determining one of a plurality of reduction positions on the predefined tooth flank geometry.

13. A method according to claim 10, wherein at least one reduction position is positioned on one outer side of the predefined tooth flank geometry.

14. A method according to claim 10, wherein at least one reduction position is positioned on one corner of the predefined tooth flank geometry.

15. A method according to claim 10, wherein at least one reduction position is positioned between two neighboring corners of the predefined tooth flank geometry.

16. A method according to claim 10, wherein at least eight reduction positions are determined in such a way that four reduction positions of the at least eight reduction positions are positioned each at one respective corner of the predefined tooth flank geometry, and another four reduction positions of the at least eight reduction positions are positioned each between two respective neighboring corners of the predefined tooth flank geometry.

17. A method according to claim 1, further comprising determining a model of the modified tooth flank geometry.

18. A method according to claim 17, further comprising determining a load value and representation of an expected contact pattern when traversing the tooth flank with a mating flank under a load that corresponds to the determined load value on the model of the modified tooth flank geometry.

19. A method according to claim 1, wherein the defining of the tooth flank geometry comprises:
defining toothing data, and
determining the predefined tooth flank geometry based on the predefined toothing data.

20. A method according to claim 1, further comprising:
defining toothing data,
determining a model of a workpiece based on the predefined toothing data, comprising determining the predefined tooth flank geometry based on the predefined toothing data, and
generating the control data for production of the workpiece, comprising generating the control data for forming the tooth flank of toothing on the workpiece.

21. A method according to claim 19, wherein the toothing data comprises at least one of:
data which denotes a size and shape of a workpiece,
data which denotes a type and shape of toothing, the shape being from at least one of a spur gear, a bevel gear, a crown wheel, a cylindrical gear or a toothed rack,
data which denotes a toothing shape, the toothing shape being from at least one of spur toothing, helical toothing, curved toothing, or spiral toothing,
data which denotes a tooth flank profile shape, the tooth flank profile shape being from at least one of an involute profile, a cycloid profile, or a circular profile,
data which denotes a size and shape of a tooth geometry of the toothing, or
data which denotes a number of teeth of the toothing.

22. An apparatus for generating control data for the formation of a tooth flank on a workpiece at a numerically controlled machine tool with at least 5 axes by using a milling cutter, the apparatus comprising a controller configured to execute:
first input means for defining a tooth flank geometry,
second input means for defining a contact pattern area on the predefined tooth flank geometry,
third input means for defining parameters to vary the predefined tooth flank geometry, means for modifying the predefined tooth flank geometry to determine a modified tooth flank geometry based on the defined contact pattern area and the defined parameters, and control data generating means for generating the control data on the basis of the modified tooth flank geometry, wherein the generated control data is configured to control the numerically controlled machine tool to produce the tooth flank on the workpiece according to the modified tooth flank geometry by milling through successive passes of the milling cutter along machining paths successively or in lines based on the generated control data.

23. An apparatus according to claim 22, further comprising the controller configured to execute:

input means for defining toothing data, means for calculating a model of a workpiece based on the predefined toothing data, comprising calculating predefined tooth flank geometry based on the predefined toothing data, and means for generating control data for the production of the workpiece, comprising generating control data for forming a tooth flank of the toothing on the workpiece.

24. A numerically controlled machine tool with at least 5 axes, comprising a device which includes a controller configured to:

define a tooth flank geometry, define a contact pattern area on the predefined tooth flank geometry, define parameters to vary the predefined tooth flank geometry, modify the predefined tooth flank geometry to determine a modified tooth flank geometry based on the defined contact pattern area and the defined parameters, and generate control data on the basis of the modified tooth flank geometry, wherein the generated control data is configured to control a numerically controlled machine tool to produce a tooth flank on a workpiece according to the modified tooth flank geometry by milling through successive passes of a milling cutter along machining paths successively or in lines based on the generated control data.

25. A memory device having instructions stored thereon that, when executed, cause a machine to perform the method of claim 1.

* * * * *